(12) United States Patent
Delaney et al.

(10) Patent No.: US 7,165,639 B2
(45) Date of Patent: Jan. 23, 2007

(54) INTEGRATED HYDRAULIC SYSTEM FOR MOTOR VEHICLES

(75) Inventors: Patrick M. Delaney, Fort Wayne, IN (US); Colin J. Casey, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 252 days.

(21) Appl. No.: 10/807,033

(22) Filed: Mar. 22, 2004

(65) Prior Publication Data

US 2005/0206113 A1 Sep. 22, 2005

(51) Int. Cl.
G60F 17/00 (2006.01)
(52) U.S. Cl. ............... 180/65.3; 180/165; 701/36
(58) Field of Classification Search ............... 180/65.3, 180/305, 306, 307, 165; 701/36, 1, 22, 69; 318/139
See application file for complete search history.

(56) References Cited

U.S. PATENT DOCUMENTS

| | | | | |
|---|---|---|---|---|
| 5,678,982 A | * | 10/1997 | Schwaiger | 417/44.2 |
| 6,634,173 B2 | * | 10/2003 | Linster et al. | 60/484 |
| 6,963,796 B2 | * | 11/2005 | Larson et al. | 701/36 |
| 2001/0037589 A1 | * | 11/2001 | Bolitho | 37/466 |
| 2002/0007979 A1 | * | 1/2002 | Wilson | 180/292 |
| 2003/0074896 A1 | * | 4/2003 | Linster et al. | 60/477 |
| 2005/0065684 A1 | * | 3/2005 | Larson et al. | 701/36 |
| 2005/0167178 A1 | * | 8/2005 | Johnson | 180/306 |
| 2005/0177288 A1 | * | 8/2005 | Sullivan et al. | 701/36 |

* cited by examiner

*Primary Examiner*—J. Allen Shriver
(74) *Attorney, Agent, or Firm*—Jeffrey P. Calfa; Gerald W. Askew; Susan L. Lukasik

(57) ABSTRACT

A hydraulic vehicle power take off system is implemented using modular components and utilizing a vehicle controller area network for integration with vehicle systems. The modular components are preferably in turn adapted from standard industry components.

5 Claims, 7 Drawing Sheets

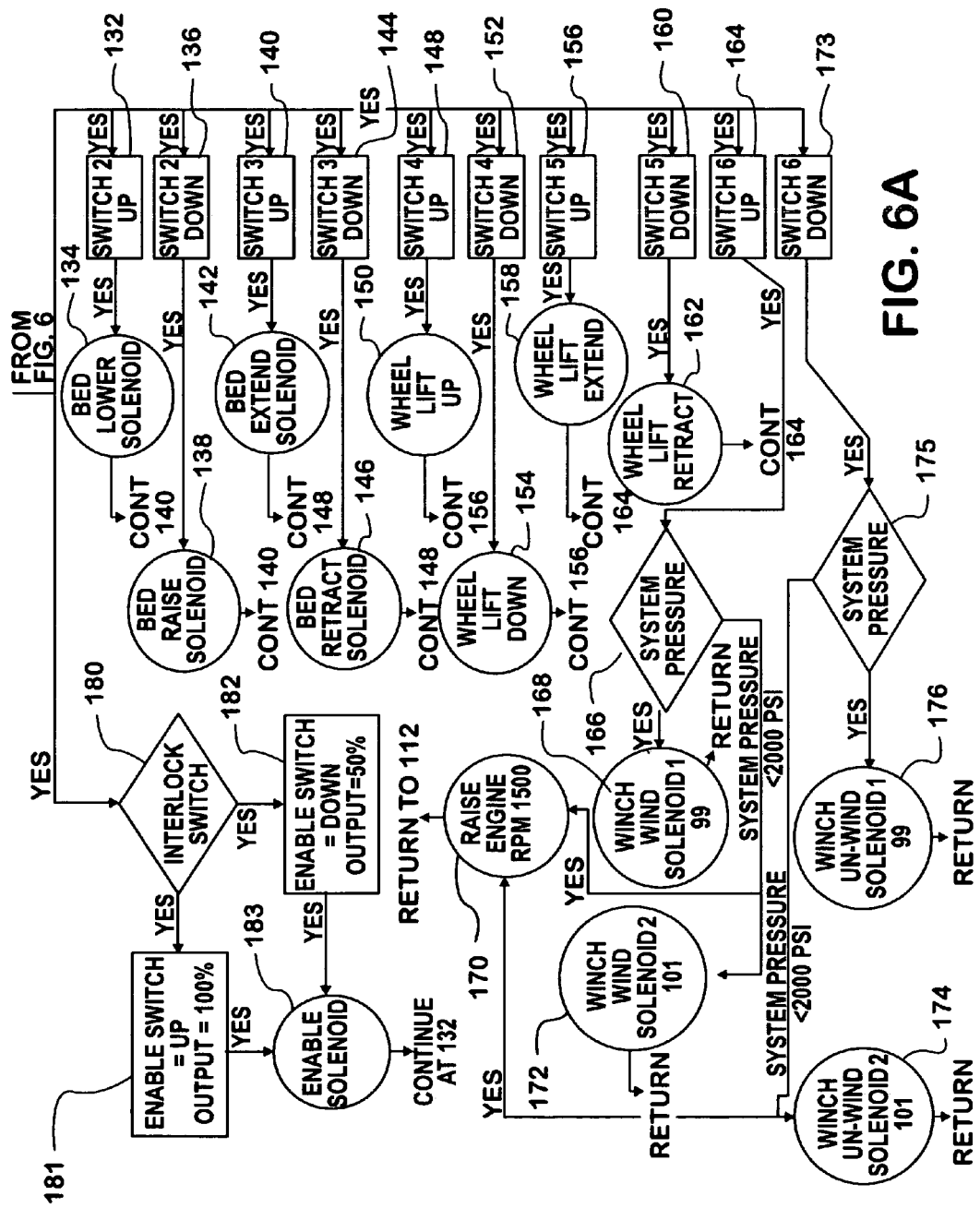

INTEGRATED HYDRAULIC SYSTEM FOR MOTOR VEHICLES

BACKGROUND OF THE INVENTION

1. Technical Field

The invention relates to hydraulic power take off systems for motor vehicles and more particularly to a modularized, hydraulic power takeoff system integrated with a vehicle's controller area network.

2. Description of the Problem

Contemporary trucks are often equipped for power takeoff operation (PTO). PTO systems are auxiliary systems, such as hoists, lifts, and pumps that are directly or indirectly powered by the vehicle's engine. Indirectly powered systems, such as hydraulic systems, are among the most popular. Power for an auxiliary hydraulic system is converted from engine output by an engine driven hydraulic pump. The hydraulic pump draws working fluid from a tank and supplies fluid to a hydraulic valve manifold which can divert the working fluid to a cylinder or impeller used to move a target load.

Although original vehicle manufacturers have supplied general purpose hydraulic pumps with vehicles suitable for supporting hydraulic power take off operation, the provision of controls and hydraulic lines has generally been left to after market specialists. Such controls have been retrofitted to vehicles, typically by the addition of wiring and hydraulic lines. Integration with other vehicle systems has been poor and the location of hydraulic tanks and modification of vehicle body systems can compromise owners' chassis warranties. Nor have these accessories been as reliable, light weight, or small as possible, nor have they conveniently provided as much power as can be required without modification of a vehicle's hardware.

SUMMARY OF THE INVENTION

According to the invention there is provided a vehicle system integrated hydraulic power take off system utilizing modular components and requiring minimum modification of the vehicle. Modular units of the system include an hydraulic fluid tank, a hydraulic valve manifold, an engine driven pump, and a switch and instrument panel. Further provided are a hydraulic valve controller and an auxiliary gauge and switch controller both of which provide for connection to a vehicle controller area network for integrating hydraulic system operation with vehicle operation. Most components of the system can be adapted from off the shelf components to minimize cost. The hydraulic fluid tank is preferably adapted from a fuel tank for mounting in conventional strap on fashion to a truck frame side rail. Control protocols are adapted from standard SAE J-1939 bus signals. The valve manifold may be mounted to the reservoir tank. Other vehicle controllers are monitored for standard signals for implementing interlocks. The engine controller may be invoked to increase engine output.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
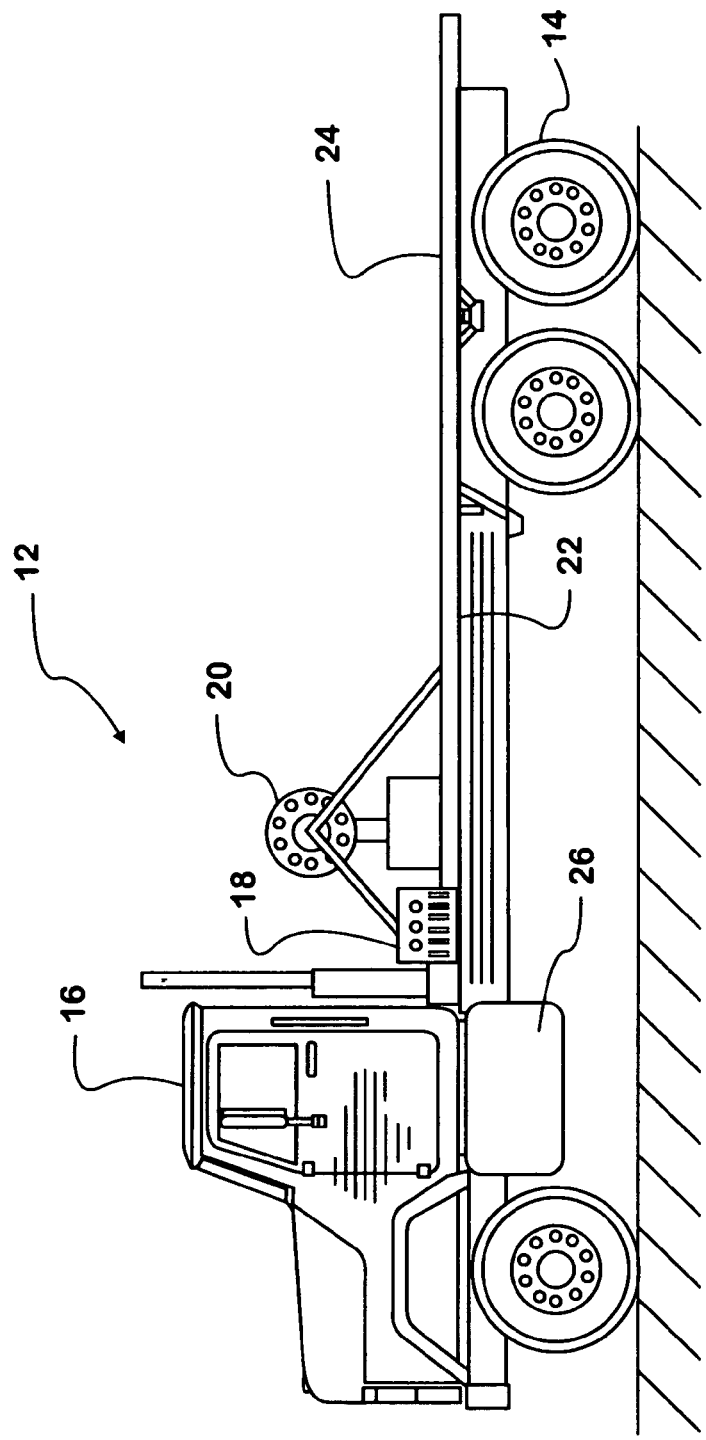
FIG. 1 is a side elevation truck with an hydraulic power takeoff operation system.

Referring now to the figures and particularly to FIG. 1, a preferred embodiment of the invention will be described. A truck 12 is adapted for service as a wrecker. A driver usually controls the vehicle from a cab 16 positioned in the forward portion of the vehicle. An auxiliary system, including a winch 20, is positioned over the vehicle siderails 22 and the rear wheels 14. Winch 20 may be used to tow a vehicle onto a pivotable extendable bed 24 for transport of the vehicle. The winch 20 is illustrated as being controlled from a panel 18 located just aft of cab 16. Panel 18 may alternatively be located inside cab 16. Panel 18 includes switches for controlling operation of the auxiliary system and gauges indicating values for hydraulic PTO system operating variables. A combined fuel tank/hydraulic fluid reservoir 24 is located under cab 16 mounted from siderail 22. While it is contemplated that the invention be applied to vehicles having internal combustion engines, it is not restricted to such vehicles. The auxiliary systems used may take any one of a number of forms, with the shared characteristic being that a hydraulic power takeoff operation system is used to operate the auxiliary system.

Figure 2:
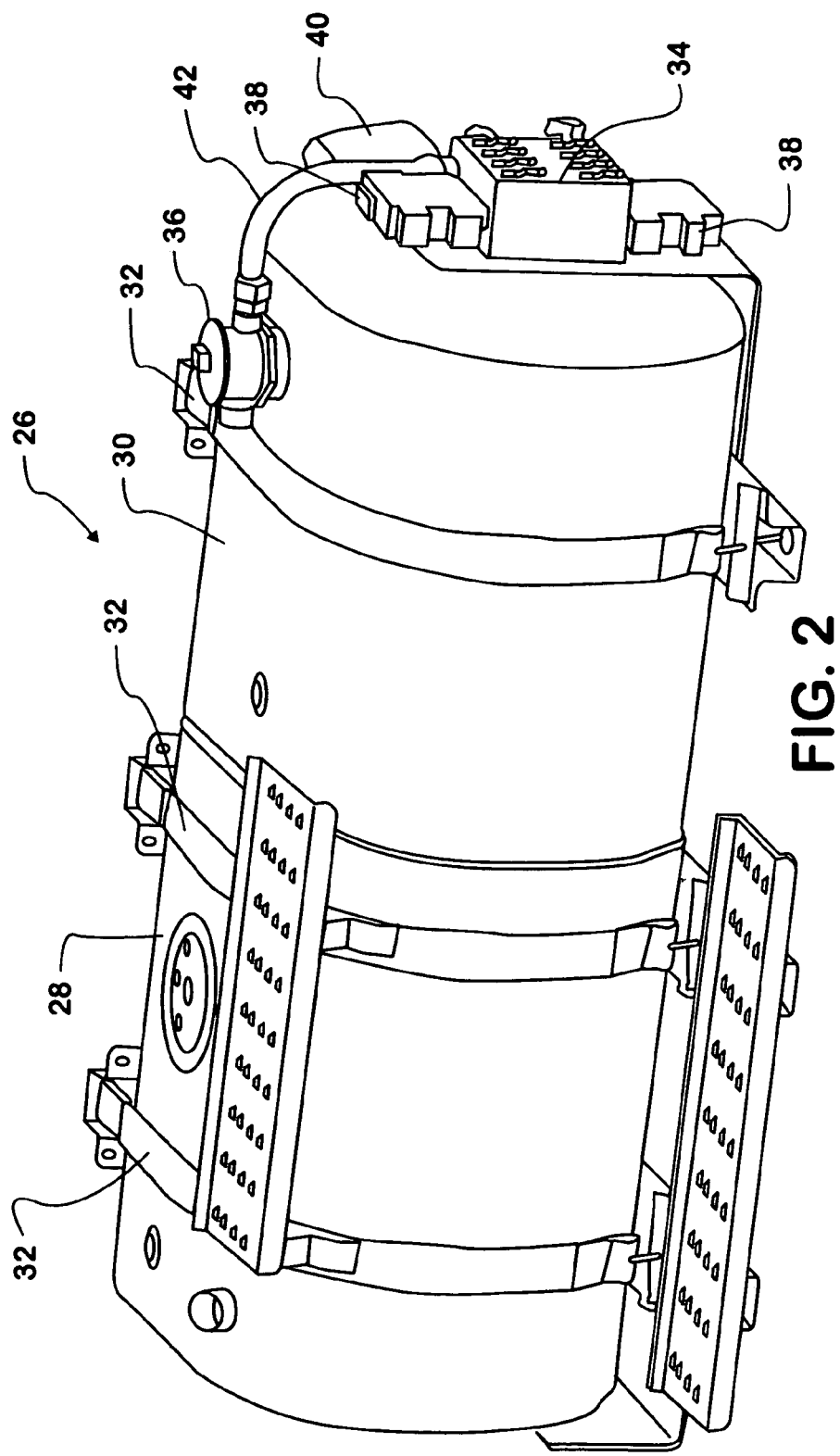
FIG. 2 is a perspective view of a combination fuel tank and hydraulic fluid reservoir suitable for attachment to a truck's siderail.

FIG. 2 illustrates a combined fuel tank/hydraulic fluid reservoir 26 utilized with a preferred embodiment of the invention. While a combined tank is shown, the invention may be implemented using a stand alone hydraulic fluid reservoir if desired. Whichever is used, the overall tank should have dimensions corresponding to those for a standard strap on saddle tank for a truck. Combined tank 26 includes a forward fuel tank 28 and an aft hydraulic fluid reservoir 30. Depending from the rear face of tank 26 is a hydraulic valve manifold 34, from which extend a plurality of hydraulic line connection points 38. A valve controller 40 is located adjacent hydraulic valve manifold 38. A return filter 36 is located on top of hydraulic fluid reservoir 30 with a conduit 42 connecting the reservoir to return filter. Combined tank 26 is attached by straps 32 to a truck frame siderail (shown above). The hydraulic pump is not shown here but is schematically illustrated in FIG. 4.

Figure 3:
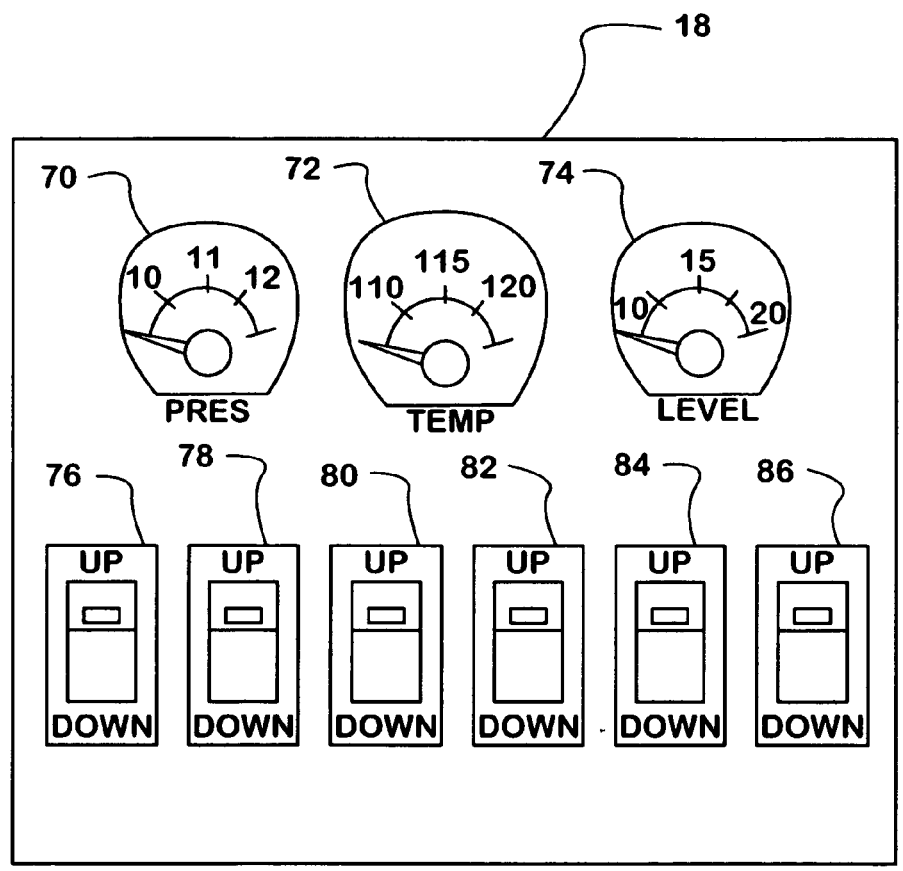
FIG. 3 is a front elevation of a control panel for the power takeoff operation system of the invention.

Referring now to FIG. 3, a control and instrument panel 18 suitable for implementing control over a hydraulic power takeoff operation system and associated vehicle auxiliary system is illustrated. While panel 18 is typically mounted on a vehicle, it may be installed on a radio controlled remote unit. Three gauges are provided including a system pressure gauge 70, an hydraulic fluid temperature gauge 72 and an hydraulic fluid level gauge 74. The gauges may incorporate warning lights to draw operator attention to out of norm operating conditions. Six three way rocker switches 76, 78, 80, 82, 84 and 86 are also provided, which may be labeled as required for the particular application of the system. Association of the switches with a particular function is implemented in software and labeling of the switches as desired will typically follow. In a preferred embodiment suitable for use with a wrecker, switch 76 is an up/down enable switch. Each switch may incorporate a light, the operation of which may be programmed to indicate system availability or state of the switch.

Figure 4:
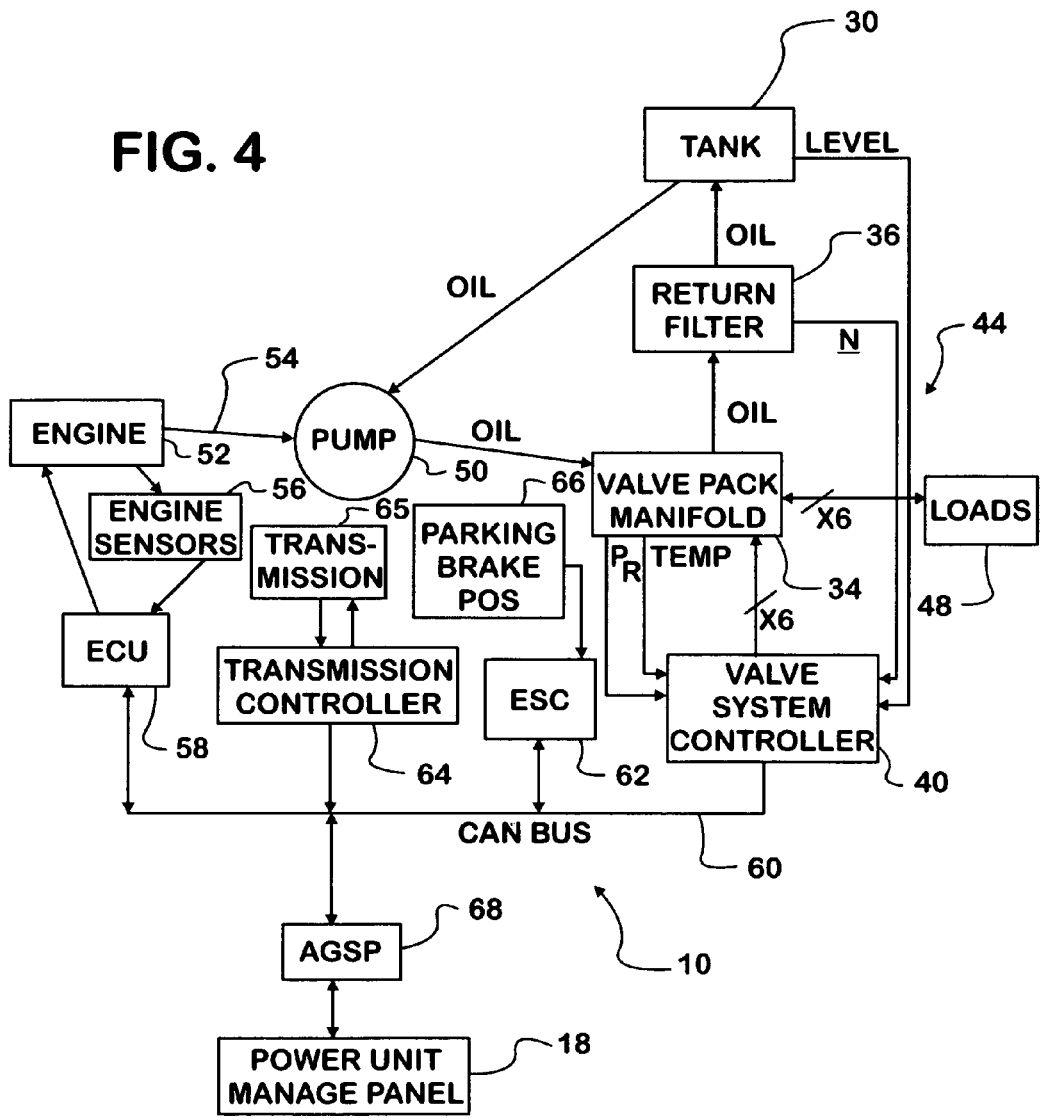
FIG. 4 is a schematic of a preferred embodiment of the present invention.

FIG. 4 illustrates a vehicle electrical control system 10 incorporating required elements to implement a hydraulic PTO system 44. Hydraulic PTO system 44 is directed to controlling loads 48, which correspond to the auxiliary systems mounted on vehicle 12, by directing pressurized hydraulic fluid to the loads from a valve pack manifold 34 as part of a circulating hydraulic fluid circuit, i.e. hydraulic PTO system 44. Hydraulic fluid circulates through the hydraulic circuit or PTO system 44 from valve pack manifold 34 to return filter 36, then to a tank or reservoir 30 from which fluid is drawn and pressurized by a pump 50 for return to the valve pack manifold. Valve positions in valve pack manifold 34 are controlled by a valve system controller 40, which includes solenoids to physically move the valves, and which monitors the hydraulic fluid level in reservoir 30 and the system oil pressure and temperature from manifold 34. Return filter 36 condition is indicated by the pressure drop across the filter which is reported by a sensor to valve system controller 40, which reports the need for maintenance to ESC 62.

Pump 50 is powered by vehicle engine 52 through a mechanical linkage 54 to the engine crankshaft (not shown). PTO operation may be enhanced by utilizing an engine control unit (ECU) 58 which monitors engine operating variables using engine sensors 56. While engine sensors 56 are illustrated as being direct intermediaries between ECU 58 and engine 52, related instruments, such as a tachometer, may in fact be connected to the transmission 65 with the resulting signal provided directly to the ECU or indirectly to the ECU through a transmission controller 64 over controller area network (CAN) bus 60. Integration of the components is preferably provided by a program resident on and executed by an electrical system controller (ESC) 62 and communicating with other controllers over CAN bus 60. As previously suggested, CAN bus 60 conforms to the SAE J1939 standard. Communication between a valve system controller 40 and an auxiliary gauge and switch package (AGSP) 68 to an operator interface (i.e. panel 18) is provided by CAN bus 60. CAN bus 60 typically provides a physical backbone comprising a twisted pair (either shielded or unshielded) cable operating as a data link or serial data bus. ESC 62 manages the assorted vocational controllers (e.g. valve system controller 40 and ECU 58) connected to bus 60 as nodes. ESC 62 may also execute a load management program which oversees the total load imposed on the vehicle electrical system and power train by various accessories installed on the vehicle.

The SAE J1939 protocol defines a number of messages which may be readily adapted to serve the requirements of a hydraulic PTO system. The auxiliary gauge and switch pack controller 68 allows hydraulic system information to be easily and conveniently displayed to the operator.

Modularity is achieved in part by providing a combined tank 26 which mounts in a standard location and by standard components used for a conventional, if oversized fuel tank; divided into a fuel tank and an oil reservoir. Attachment of the valve manifold 34 and valve system controller 40 to tank 30 offers a particularly advantageous location for these components standardizing the connection between the components and the tank. Control is readily implemented using a conventional instrument cluster (panel 18) connected communicating with the required devices over a conventional CAN bus 60. Pump 50 is readily mounted in a standardized location on engine 52 using a predetermined bracket set. The only non-standard components which vary from one application to another should be hydraulic lines, other than those to the engine mounted pump 50, and minor programming changes.

Figure 5:
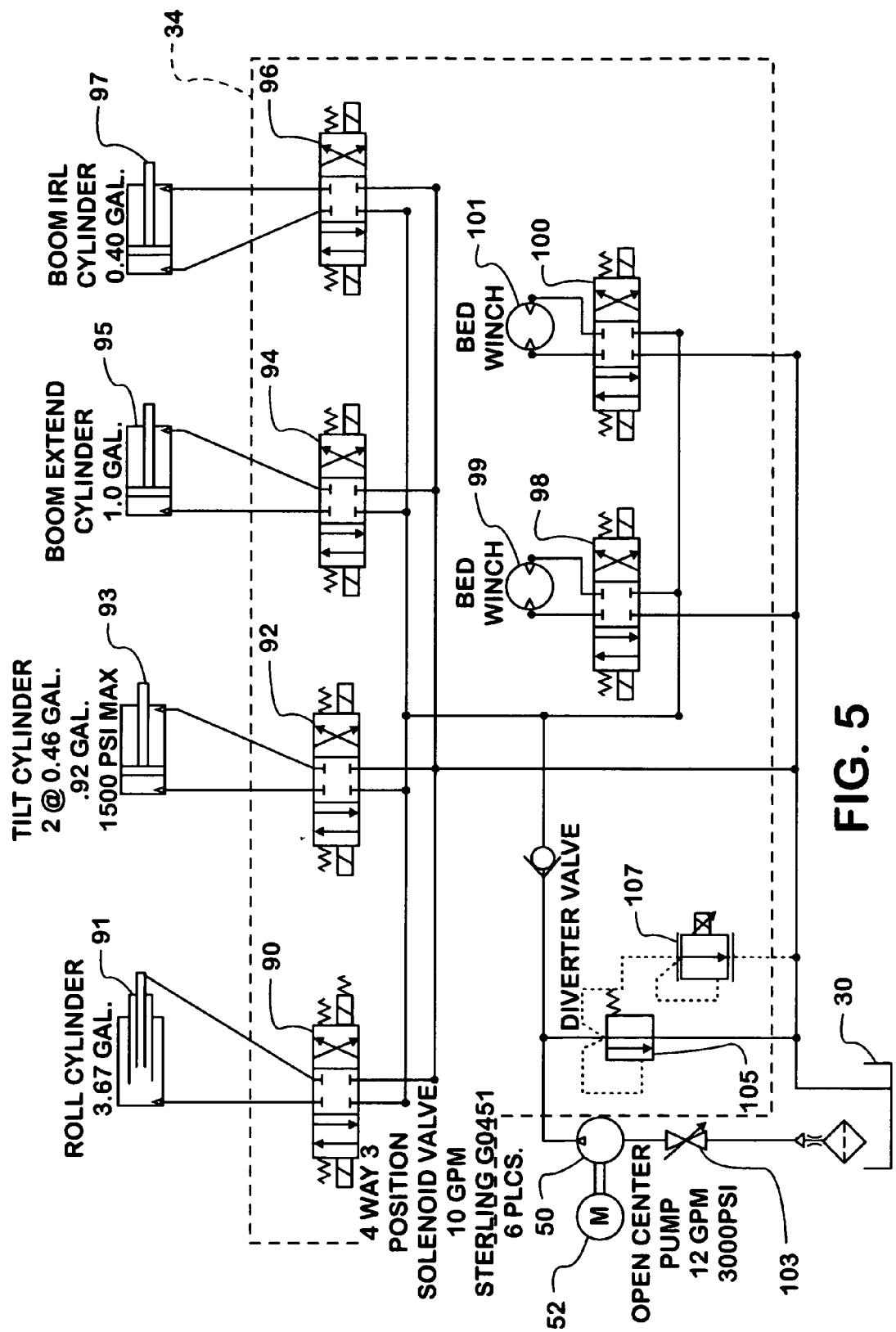
FIG. 5 is a control schematic for a hydraulic valve manifold utilized with the present invention.

Referring to FIG. 5, the circuit of hydraulic system 44 is illustrated in greater detail. Valve pack manifold 34 conventionally provides a total of six, four way, three position valves, here connected for supporting operation of a truck configured as a wrecker and connected to assorted hydraulic actuators. A first valve 90 is connected to a roll control cylinder 91, a second valve 92 is connected to a bed tilt control cylinder 93, a third valve 94 is connected to a boom extension cylinder 95, a fourth valve 96 is connected to a boom retraction (IRL) cylinder 97, a fifth valve 98 is connected to a first bed winch impeller 99 and a sixth valve 100 is connected to a second bed winch impeller 101. Reservoir 30 collects hydraulic fluid from valve manifold 34 from which it is drawn by pump 50. Impellers 99 and 101 are optimized to operate at different system pressures. Diverter valves 105 and 107 provide pressure control. Pump 50 in one embodiment is an engine driven pump providing 12 gallons per minute flow at 3000 psi. Each valve is rated for a maximum flow of 10 g.p.m.

Figure 6:
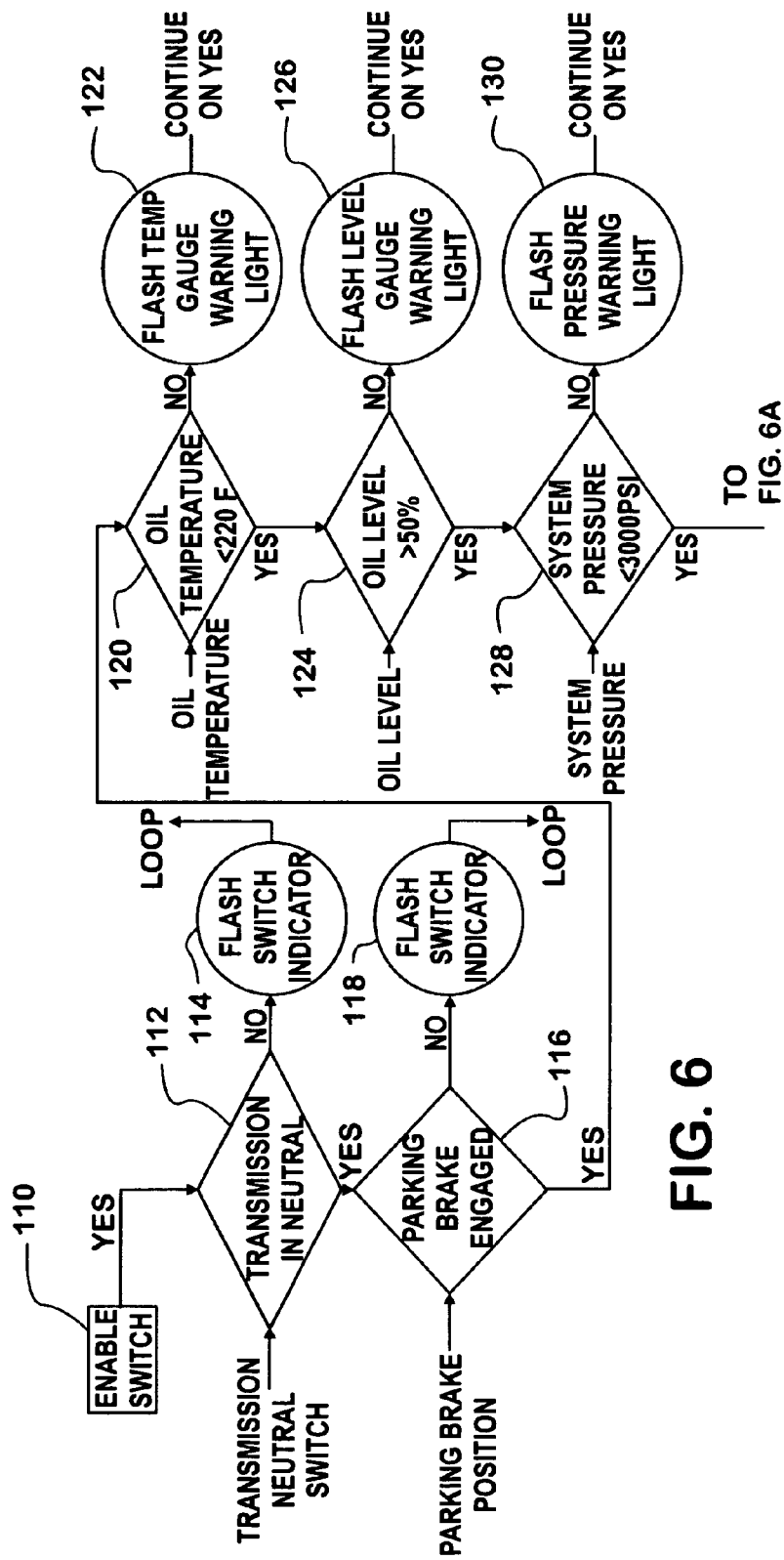
FIG. 6 is a flow chart of a control program for the present invention.

Program control of the hydraulic PTO system of the present invention may be distributed among the assorted controllers of the vehicle's electrical control system, but is preferably resident in and primarily executed on the ESC 62. Referring to FIG. 6 a flow chart illustrates a representative sequence of steps taken to implement network control over PTO. Execution of the program is initialized by closure of an enable switch 110, placing transmission 65 into neutral and engaging the parking brake 66. Transmission controller 64 reports the position of the transmission at interrogatory step 112 and the ESC 62 determines the position of the parking brake at interrogatory step 116. Determination that either condition is not met, after engaging the enable switch, results in flashing an indicator light on the vehicle instrument panel for the indicated device on and off, as indicated at steps 114 and 118, following NO branches from the interrogatory steps 112 and 116, respectively. Steps 112 and 116 are looped so that once the indicated steps are taken with the parking brake and transmission program execution is allowed to proceed. If the transmission is in neutral, and the parking brake is engaged, an interlock switch is set. In the flow chart the notation "return" or "loop" indicates a return to step 112 while "continue" indicates a continued execution following the opposite branch from the most recent execution division or at the step indicated.

Continued operation of the hydraulic PTO system may be programmed to depend upon working fluid condition related variables, namely hydraulic oil temperature, hydraulic oil level and system pressure, all falling within certain limits. Decision steps 120, 124 and 128 indicate compiling of the three variables and the generation of flashing warning lights at steps 122, 126 and 130 following the NO branches from the decision steps. In the preferred embodiment, when oil temperature meets or exceeds 220EF, oil level falls below 50% of the desired level, or system pressure meets or exceeds 3000 psi, warning lights are flashed. All conditions are periodically monitored by looping through the decision steps.

Steps 180 to 183 represent determination of PTO power setting if the interlock switch is set by engagement of the parking brake and positioning of the transmission in neutral. If the interlock is engaged and the enable switch up (typically the first switch, i.e. switch 76 on panel 18) indicating operations involving moving a vehicle on, off, or into position for loading onto a wrecker (step 181), PTO power is set to 100% using the enable solenoid. If the enable switch is down (step 182) power is set to 50% reflecting the lesser power requirements for paying out the hoist, rewinding the hoist or repositioning the bed without a vehicle. Execution then continues with scanning changes in position of each of the remaining five switches on panel 18.

Steps 132 and 136 reflect actions (lowering and raising the wrecker bed, steps 134 and 138, respectively) taken in response to switch 78 (#2) being moved to the up and down positions. Steps 140 and 144 reflect actions (extending and retracting the wrecker bed, steps 142 and 146, respectively) taken in response to switch 80 (#3) being moved to the up and down positions. Steps 148 and 152 reflect actions (wheel lift up and wheel lift down, steps 150 and 154, respectively) taken in response to switch 82 (#4) being moved to the up and down positions. Steps 156 and 160 reflect actions (extending wheel lift and retracting wheel lift, steps 158 and 126, respectively) taken in response to switch 84 (#5) being moved to the up and down positions. Finally, movement of switch 86 on panel 18, relating to winch operation, is determined at steps 164 (up) and 173 (down). Winch operation is made dependent upon system hydraulic pressure and accordingly several decision steps are involved before particular solenoids are actuated. Where switch 86 is up, step 166 is executed to determine system pressure. If system pressure exceeds 2000 psi winch 20 is wound by actuating the solenoid for valve 98. If system pressure is less than 2000 psi, winch 20 is wound by actuating the solenoid for valve 100 and simultaneously raising engine rpms by 1500 to boost system pressure (steps 166, 168, 170 and 172). Similarly, when switch 86 is down, system pressure is checked (step 175). If pressure is greater than 2000 psi the winch is unwound with actuation of the solenoid for valve 98 (step 176). If hydraulic system pressure is less than 2000 psi, the solenoid for valve 100 is actuated (step 174) and a request to raise engine rpm 1500 is made (step 170). Requests for boosts in engine output are passed to engine controller 58. It will be understood that a change in system pressure results in a shift in operation from one valve to the other.

The invention provides the components for implementing a modularized power take off system which may be installed on a truck with minimum modification to the vehicle, either on the assembly line or as an accessory at the dealer. The modular power units are adapted to attach to a convenient point in the vehicle and for communication after connection to a vehicle control system. Hydraulic power takeoff is standardized. Power take off systems in accordance with the invention are non-the-less fully integrated with a motor vehicle control system for efficient operation supported by the vehicle's prime mover.

While the invention is shown in only one of its forms, it is not thus limited but is susceptible to various changes and modifications without departing from the spirit and scope of the invention.

What is claimed is:

1. A motor vehicle comprising:
   an engine;
   a controller area network;
   an hydraulic power take off pump driven by the engine;
   an hydraulic circuit connected to the hydraulic power take off pump for energization;
   a plurality of sensors coupled to the hydraulic circuit for generating values for operating variables of the hydraulic circuit;
   an auxiliary gauge and switch package connected to the controller area network for data communication;
   a management panel under the control of the gauge and switch package for displaying hydraulic system operating variables and providing operator controls, the auxiliary gauge and switch package providing for generating control signal requests for transmission over the controller area network responsive to operator manipulation of the management panel;
   a valve system controller connected to the controller area network and further coupled to the hydraulic system for monitoring hydraulic system operating variables and controlling hydraulic system valve positions;
   an electrical system controller connected to the controller area network for data communication; and
   a control program resident on a selected one of the controllers connected to the controller area network for integrating power take off operation of the hydraulic system with vehicle operation and responsive to operating variables and request for control signals for generating control signals.

2. A motor vehicle as set forth in claim 1, further comprising:
   the control program being resident on the electrical system controller.

3. A motor vehicle as set forth in claim 2, further comprising:
   a plurality of engine performance sensitive sensors including a tachometer;
   an engine control unit connected to the controller area network for data communication and coupled to the plurality of engine sensors for monitoring engine operating variables and further coupled to the engine for controlling engine output; and
   the control program including steps responsive to the hydraulic system operating variables for communicating a request to the engine control unit to increase engine output.

4. A motor vehicle as set forth in claim 1, further comprising:
   a transmission controller providing indication of vehicle transmission status;
   means for indicating parking brake status; and
   the control program being responsive to the vehicle transmission status and parking brake status for setting an interlock status.

5. A motor vehicle as set forth in claim 1, the hydraulic system further comprising:
   a saddle tank mounted to a frame siderail for storing and supplying hydraulic fluid to the hydraulic circuit.

* * * * *